US011137361B2

(12) United States Patent
Karschnia et al.

(10) Patent No.: US 11,137,361 B2
(45) Date of Patent: Oct. 5, 2021

(54) PROCESS VESSEL INSULATION MONITORING

(71) Applicant: Rosemount Inc., Shakopee, MN (US)

(72) Inventors: Robert J. Karschnia, Chaska, MN (US); Theodore Henry Schnaare, Carver, MN (US)

(73) Assignee: ROSEMOUNT INC., Shakopee, MN (US)

( * ) Notice: Subject to any disclaimer, the term of this patent is extended or adjusted under 35 U.S.C. 154(b) by 300 days.

(21) Appl. No.: 16/134,243

(22) Filed: Sep. 18, 2018

(65) Prior Publication Data

US 2020/0088663 A1 Mar. 19, 2020

(51) Int. Cl.
*G01K 1/00* (2006.01)
*G01K 7/00* (2006.01)
(Continued)

(52) U.S. Cl.
CPC .............. *G01N 25/18* (2013.01); *F16L 59/14* (2013.01); *G01D 21/02* (2013.01); *G01K 17/08* (2013.01); *G01N 25/52* (2013.01); *G01N 25/56* (2013.01)

(58) Field of Classification Search
USPC .................. 374/208, 141, 166, 110, 163, 137
See application file for complete search history.

(56) References Cited

U.S. PATENT DOCUMENTS

2003/0079553 A1   5/2003   Cain et al.
2012/0056634 A1   3/2012   Bohon et al.
(Continued)

FOREIGN PATENT DOCUMENTS

| CN | 203349859 U | 12/2013 |
|---|---|---|
| CN | 104061443 A | 9/2014 |
| CN | 105651856 A | 6/2016 |

OTHER PUBLICATIONS

Notification of Transmittal of the International Search Report and the Written Opinion of the International Searching Authority from International Application No. PCT/US2019/037701, dated Sep. 13, 2019.

(Continued)

*Primary Examiner* — Mirellys Jagan
(74) *Attorney, Agent, or Firm* — Westman, Champlin & Koehler, P.A.

(57) ABSTRACT

An industrial process vessel insulation monitoring system for monitoring an insulated section of a process vessel containing a process material includes one or more condition sensors and a controller. The condition sensors are configured to sense at least one environmental condition, such as temperature, humidity, moisture level, and/or chemical composition, and generate condition outputs that are indicative of the corresponding sensed condition. The controller is configured to detect at least one section condition relating to the insulated section based on the condition output, and generate condition information relating to the at least one detected section condition. Examples of the section conditions include a thermal resistance of an insulation of the insulated section, damage or degradation to an insulation of the insulated section, corrosion of the process vessel at the insulated section, conditions that promote corrosion of the process vessel, and moisture intrusion to the insulation.

19 Claims, 4 Drawing Sheets

(51) Int. Cl.
*G01K 3/00* (2006.01)
*G01N 25/18* (2006.01)
*F16L 59/14* (2006.01)
*G01D 21/02* (2006.01)
*G01K 17/08* (2006.01)
*G01N 25/52* (2006.01)
*G01N 25/56* (2006.01)

(56) References Cited

U.S. PATENT DOCUMENTS

| | | | |
|---|---|---|---|
| 2014/0161151 A1* | 6/2014 | Proctor | G01K 1/143 |
| | | | 374/147 |
| 2014/0305524 A1 | 10/2014 | Heizer et al. | |
| 2017/0045412 A1 | 2/2017 | Yunker et al. | |

OTHER PUBLICATIONS

Communication Pursuant to Rules 161(1) and 162 from European Patent Application No. 1974503.6, dated Feb. 19, 2021.
Office Action from Chinese Patent Application No. 201811579563.5, dated Apr. 6, 2021.

* cited by examiner

PROCESS VESSEL INSULATION MONITORING

BACKGROUND

Embodiments of the present disclosure relate to industrial process control systems for industrial plants. More specifically, embodiments of the present disclosure relate to monitoring process vessel thermal insulation health.

In industrial settings, control systems are used to monitor and control inventories of industrial and chemical processes, and the like. Thermal insulation systems are critical assets within typical industrial plants, such as oil refineries, chemical plants and food and beverage production facilities, for example. Such systems typically utilize an insulative material that surrounds a process vessel (e.g., a pipe, a conduit, or a tank) and reduces heat transfer between the process material within the process vessel and the surrounding environment. Insulation systems that are compromised due to physical damage or environmental influences can lead to reduced operating efficiency and product quality.

SUMMARY

Embodiments of the present disclosure are directed to an industrial process vessel insulation monitoring system for monitoring an insulated section of a process vessel containing a process material, an industrial process vessel insulation monitoring device, and a method of monitoring an insulated process vessel. One embodiment of the system includes one or more condition sensors and a controller. The one or more condition sensors are configured to sense at least one environmental condition at or within the insulated section of the process vessel, such as temperature, humidity, moisture level, and/or chemical composition. Each of the one or more condition sensors is configured to generate a condition output that is indicative of the corresponding sensed condition. The controller is configured to detect at least one section condition relating to the insulated section based on the condition output, and generate condition information relating to the at least one detected section condition. Examples of the section conditions include a thermal resistance of an insulation of the insulated section, damage or degradation to an insulation of the insulated section, corrosion of the process vessel at the insulated section, conditions that promote corrosion of the process vessel, and moisture intrusion to the insulation.

One embodiment of the industrial process vessel insulation monitoring device includes a section of insulation, and a plurality of condition sensors that are attached to the insulation. The plurality of condition sensors is configured to sense at least one environmental condition at or within the section of insulation. Examples of the environmental condition include temperature, humidity, moisture level and/or chemical composition. Each of the plurality of condition sensors is configured to generate condition outputs that are indicative of the corresponding sensed condition.

In one embodiment of the method of monitoring an insulative process vessel, the above-described insulation monitoring device is provided. Condition outputs using the plurality of condition sensors are generated using the plurality of condition sensors. Each condition output indicates the corresponding sensed condition. At least one section condition relating to the section of insulation and the process vessel is detected based on the condition outputs using a controller. Examples of the section conditions include a thermal resistance of an insulation of the insulated section, damage or degradation to an insulation of the insulated section, corrosion of the process vessel at the insulated section, conditions that promote corrosion of the process vessel, and moisture intrusion to the insulation. Condition information relating to the at least one detected section condition is generated using the controller.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Embodiments of the present disclosure are described more fully hereinafter with reference to the accompanying drawings. Elements that are identified using the same or similar reference characters refer to the same or similar elements. The various embodiments of the present disclosure may be embodied in many different forms and should not be construed as limited to the particular embodiments set forth herein. Rather, these embodiments are provided so that this disclosure will be thorough and complete, and will fully convey the scope of the present disclosure to those skilled in the art.

Figure 1:
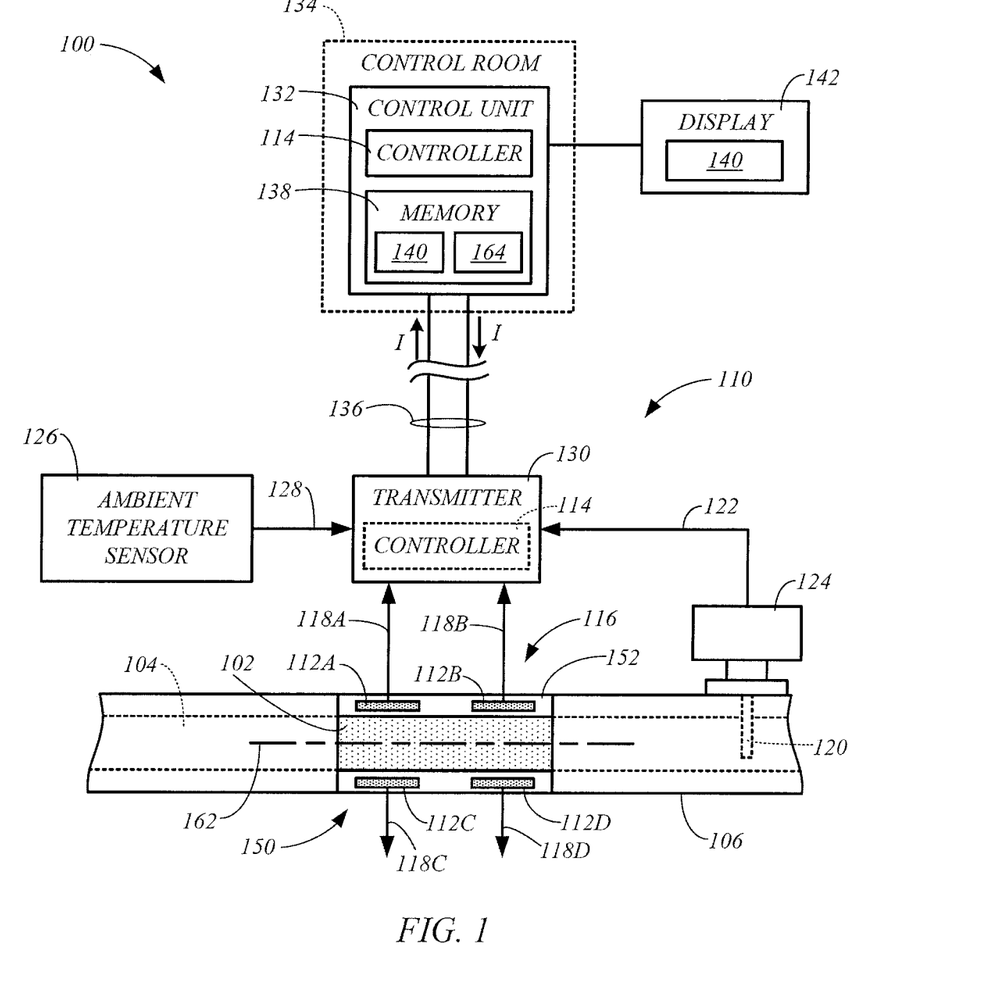
FIG. 1 is a simplified diagram of an exemplary industrial process measurement or control system 100, in accordance with embodiments of the present disclosure.

FIG. 1 is a simplified diagram of exemplary industrial process measurement or control system 100, in accordance with embodiments of the present disclosure. The system 100 may be used in the processing of a process material 102, such as a fluid (i.e., liquid or gas), a solid (i.e., granular or powdered material), a slurry, etc., to transform the material from a less valuable state into more valuable and useful products, such as petroleum, chemicals, paper, food, etc. For example, an oil refinery performs industrial processes that can process crude oil into gasoline, fuel oil, and other petrochemicals.

The process material 102 may be contained or transported through a process vessel 104, such as a tank, a pipe, or another process vessel. The process vessel 104 may be insulated using a suitable thermal insulation 106, as shown in FIG. 1. As discussed above, the insulation 106 may degrade over time, which can affect the thermal resistance (i.e., R-value) of the insulation 106. Additionally, the deterioration of the insulation 106 can affect the health of the vessel 104 itself. For example, the deterioration of the insulation 106 can lead to the presence of moisture at the interface between the exterior surface of the process vessel 104 and the interior of the insulation 106, which can lead to a corrosion under insulation (CUI) condition at the exterior surface of the vessel 104.

Embodiments of the present disclosure are directed to a process vessel insulation monitoring system 110 that is configured to monitor and/or detect one or more conditions relating to the process vessel 104 and/or the insulation 106, such as the thermal resistance of the insulation 106, CUI conditions, moisture intrusion, and/or other conditions relating to the vessel 104 and/or the insulation 106.

Some embodiments of the monitoring system 110 include one or more condition sensors 112, generally referred to as 112, and a controller 114. In some embodiments, the sensors 112 of the monitoring system 110 include one or more sensors for sensing conditions at an insulated section 116 relating to the insulation 106 and the process vessel 104, and generating one or more outputs, generally referred to as 118, that indicate the sensed conditions.

In some embodiments, the sensors 112 may include one or more temperature sensors 112A having a temperature output 118A, one or more moisture level sensors 112B having a moisture level output 118B, one or more chemical composition sensors 112C having a chemical composition output 118C, one or more humidity sensors 112D having a humidity output, and/or sensors 112 configured to monitor other environmental conditions of the insulated section 116. Thus, the one or more condition sensors 112 may be configured to sense temperature, moisture, humidity, chemical composition, and/or another environmental condition relating to the insulated section 116 of the vessel 104, and generate one or more condition outputs 118 indicating the sensed conditions. The controller 114 detects the one or more conditions relating to the process vessel insulation 106 based on the one or more sensed environmental conditions indicated by the condition outputs 118.

The temperature sensor or sensors 112A may be configured to monitor temperatures associated with the insulated section 116 of the process vessel 104, and generate temperature outputs 118A relating to the sensed temperatures. As discussed below in greater detail, the temperature sensor outputs 118A may be used by the controller 114 to measure a thermal resistance of the insulation 106, detect missing, damaged, or degraded insulation 106, and detect conditions which may indicate, or lead to a CUI condition, for example. The one or more temperature sensors 112A may utilize any suitable temperature sensor, such as a resistance temperature detector, a negative temperature coefficient thermistor, a thermocouple, a semiconductor-based temperature sensor, or other suitable temperature sensor.

The moisture level sensor or sensors 112B are configured to monitor a moisture level associated with the insulated section 116 of the process vessel 104, and generated moisture level outputs 118B relating to the detected moisture levels. The moisture level outputs 118B may be used by the controller 114 to detect conditions that may lead to a CUI condition, damage to the insulation 106, and other conditions of the insulated section 116. The one or more moisture level sensors 112B may include a moisture detection cable or other suitable moisture sensor.

The chemical composition sensor or sensors 112C may be used to detect the presence of corrosive chemicals, such as acids, alkalis, and/or salts, and/or corrosion by-products, such as metal oxides, and generate chemical composition outputs 118C that indicate the detection of such corrosion by-products. Thus, the chemical composition outputs 118C may be used by the controller 114 to detect a CUI condition, for example. The one or more chemical composition sensors 112C may take on any suitable form. Exemplary sensors 112C include pH, oxygen reduction potential, electrical conductivity, and insulation resistance sensors.

The humidity sensor or sensors 112D may be used to sense a humidity level, and generate humidity level outputs 118D that indicate the sensed humidity level. Thus, the humidity level outputs 118D may be used by the controller 114 to detect conditions that may promote a CUI condition, for example. The one or more humidity sensors 112D may take on any suitable form.

The monitoring system 110 may also include a process temperature sensor 120, which is configured to detect a temperature of the process material 102, and generate a process temperature output 122 that is indicative of the sensed temperature. The process temperature sensor 120 may be a component of a field device 124 that is coupled to the process, as shown in FIG. 1. The process temperature output 122 may be used by the controller 114 to, for example, detect the thermal resistance of the insulation and other conditions of the insulated section 116.

The monitoring system 110 may also include an ambient temperature sensor 126 that is configured to detect a temperature of the environment at, or near, the insulated section 116 of the process vessel 104, and generate an ambient temperature output 128 based on the sensed temperature. The controller 114 may use the ambient temperature output 128 in the assessment or detection of conditions of the insulated section 116, such as the thermal resistance of the insulation 106 or damage to the insulation 106, for example.

In some embodiments, the monitoring system 110 includes a transmitter 130 that is configured to receive the output signals (e.g., condition outputs 118, process temperature output 122, and ambient temperature output 128) from the one or more sensors, and transmit section information, which is based on the output signals, to a control unit 132. The control unit 132 may be remotely located from the transmitter in a control room 134, for example, as shown in FIG. 1. The control unit 132 may be communicatively coupled to the transmitter 130 over a suitable physical communication link, such as a two-wire control loop 136, or a wireless communication link. Communications between the control unit 132 and the transmitter 130 may be performed over the control loop 136 in accordance with conventional analog and/or digital communication protocols.

In some embodiments, the control loop 136 includes a 4-20 milliamp control loop, in which the one or more sensor outputs (e.g., condition outputs 118, process temperature output 122, and ambient temperature output 128) may be represented by a level of a loop current I flowing through the control loop 136. Exemplary digital communication protocols include the modulation of digital signals onto the analog current level of the two-wire control loop 136, such as in accordance with the HART® communication standard. Other purely digital techniques may also be employed including FieldBus and Profibus communication protocols.

The transmitter 130 may also be configured to communicate wirelessly with the control unit 132 using a conventional wireless communication protocol. For example, the transmitter 130 may be configured to implement a wireless mesh network protocol, such as WirelessHART® (IEC 62591) or ISA 100.11a (IEC 62734), or another wireless communication protocol, such as WiFi, LoRa, Sigfox, BLE, or any other suitable protocol.

Power may be supplied to the transmitter 130 from any suitable power source. For example, the transmitter may be wholly powered by the current I flowing through the control loop 136. A suitable power supply may also be utilized to power the transmitter 130, such as an internal or an external battery. An electrical power generator (e.g., solar panel, a wind power generator, etc.) may also be used to power the transmitter 130 and/or charge an internal or external battery source for the transmitter 130.

The controller 114 may represent components of the transmitter and/or the control unit, as shown in FIG. 1. The controller 114 includes one or more processors (i.e., microprocessor, central processing unit, etc.) that perform one or more functions described herein in response to the execution of instructions, which may be stored locally in non-transitory computer readable media or memory of the control unit, such as memory 138, or memory of the transmitter, for example. In some embodiments, the processors of the controller 114 are components of one or more computer-based systems, such as the control unit 132. The controller 114 may include one or more control circuits, microprocessor-based engine control systems, one or more programmable hardware components, such as a field programmable gate array (FPGA), that are used to control components of the monitoring system 110 and/or perform one or more functions described herein. The controller 114 may also represent other conventional industrial process transmitter or control unit circuitry.

In some embodiments, the controller 114 detects one or more conditions relating to the insulated section 116 of the process vessel 104 based on one or more of the condition outputs 118 from the sensors 112. Additionally, the controller 114 is configured to generate condition information 140 relating to the detected condition or conditions of the section 116 of the process vessel 104.

When the controller 114 is entirely or partially contained within the transmitter 130, the transmitter 130 may communicate the condition information 140 to the control unit 132 as the transmitted section information mentioned above. Alternatively, the section information transmitted by the transmitter 130 relating to the condition outputs 118 may be used by the controller 114 of the control unit 132 to produce the condition information 140.

In some embodiments, the condition information 140 generally includes information regarding each detected condition, such as, for example, an identification of the detected condition, values of the sensed conditions relating to the detected condition (e.g., temperature measurements, humidity measurements, moisture level measurements, chemical composition measurements, etc.), and/or other information. The condition information 140 may be logged in memory of the system 110, as indicated in FIG. 1, or communicated to a desired data storage system or computing device, for example. The controller 114 may issue a notification relating to the condition information 140 including displaying of the condition information 140 on a display, such as the display 142 of the control unit 132, or another display, triggering an alarm, and/or providing another type of notification.

Figure 2:
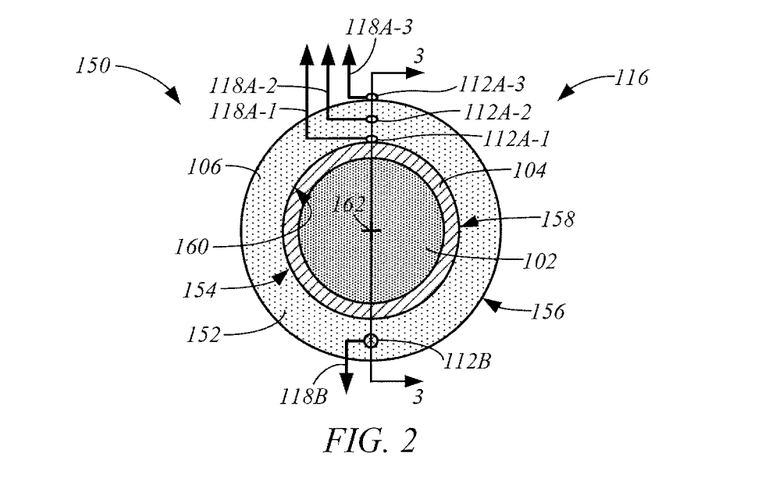
FIG. 2 is a simplified cross-sectional view of an exemplary insulating monitoring device, in accordance with embodiments of the present disclosure.
Figure 3:
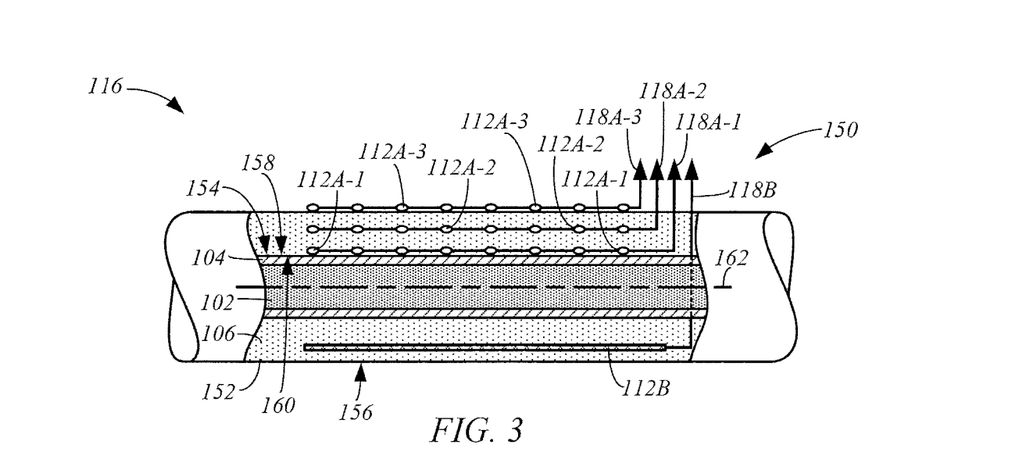
FIG. 3 is a simplified cross-sectional view of the device of FIG. 2 taken generally along line 3-3, in accordance with embodiments of the present disclosure.

Some embodiments of the industrial process vessel insulation monitoring system 110 include an industrial process vessel insulation monitoring device 150 that generally includes a section 152 of the insulation 106 and one or more of the condition sensors 112 described above, which are attached to the insulation section 152, as shown in FIG. 1. Exemplary embodiments of the insulation monitoring device 150 will be described with reference to FIGS. 2 and 3. FIG. 2 is a simplified cross-sectional view of an exemplary insulating monitoring device 150, and FIG. 3 is a simplified cross-sectional view of the device 150 of FIG. 2 taken generally along line 3-3, in accordance with embodiments of the present disclosure.

In some embodiments, the insulation section 152 may comprise a sleeve of insulation 106 that completely surrounds the process vessel 104 (e.g., pipe), as shown in FIG. 2. For example, the insulation section 152 may be configured to wrap around the process vessel 104. Alternatively, the insulation section 152 may form only a portion of the insulation 106 that insulates the process vessel 104.

The device 150 may include one or more of the temperature sensors 112A at various locations between an exterior surface 154 of the process vessel 104 and an exterior surface 156 of the insulation section 152. For example, the device 150 may include one or more interface temperature sensors 112A-1 at an interface 158 between the insulation section 152 and the exterior surface 154 of the process vessel 104, one or more embedded temperature sensors 112A-2 within the insulation section 152, and/or one or more exterior temperature sensors 112A-3 at the exterior surface 156 of the insulation section 152, as shown in FIGS. 2 and 3. The interface temperature sensors 112A-1 may be attached to an interior surface 160 of the insulation section 152, or positioned between the interior surface 160 of the insulation section 152 and the exterior surface 154 of the process vessel 104 when the insulation section 152 is installed on the process vessel 104. The exterior temperature sensors 112A-3 may be attached on the exterior surface 156 of the insulation section 152 using any suitable technique, or embedded in the exterior surface 156 of the insulation section 152. Accordingly, in some embodiments, the one or more temperature sensors 112A includes at least two temperature sensors that are positioned at different radial distances from a longitudinal axis 162 of the process vessel 104 or the insulation section 152, as shown in FIG. 2.

In some embodiments, the interface temperature sensors 112A-1 are used to detect temperatures that promote a CUI condition. For example, when the interface temperature indicated by the output 118A-1 of the interface temperature sensors 112A-1 is within a temperature range that promotes corrosion of the process vessel 104, the controller 114 may generate condition information relating to the detection, such as, for example, a notification indicating the presence, or the potential development of, a CUI condition.

The interface temperature sensors 112A-1 may also be used to detect damage or degradation to the insulation section 152. In some embodiments, the controller 114 compares the temperature indicated by the output 118A-1 to an anticipated temperature or temperature range that is expected to be detected by the interface temperature sensors 112A-1, and detects damage to the insulation section 152 when the difference between the detected interface temperature and the anticipated interface temperature or temperature range exceeds a corresponding threshold value 164, which may be stored in the memory 138 (FIG. 1) of the control unit 132, for example. The controller 114 may generated condition information 140 relating to the detected damage or degradation to the insulation section 152, which may include a notification of the degraded condition of the insulation section 152. In some embodiments, the controller 114 sets the anticipated interface temperature based on the process temperature sensed by the process temperature sensor 120, and/or the ambient temperature sensed by the ambient temperature sensor 126.

Figure 4:
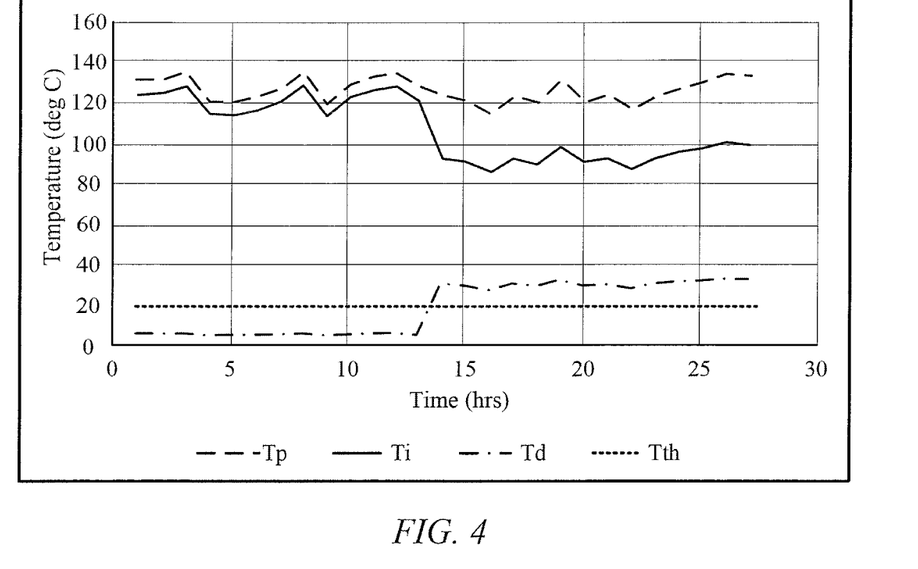
FIG. 4 is a chart including plots of exemplary measured interface and process temperatures over time, a difference between the interface and process temperatures, and a threshold temperature difference, in accordance with embodiments of the present disclosure.

When the insulation section 152 is substantially undamaged, the difference between the interface temperature and the process temperature is small, but when the insulation section 152 becomes damaged, its insulative performance drops and the difference between the interface temperature and the process temperature increases. This is generally illustrated in the chart of FIG. 4, which includes plots of exemplary measured interface temperatures ($T_i$) and process temperatures ($T_p$) over time, a difference ($T_d$) between the interface and process temperatures, and a threshold temperature difference value ($T_{th}$), in accordance with embodiments of the present disclosure. The threshold temperature difference value, which may be stored as one of the threshold values 164 (FIG. 1), is used to evaluate the condition of the insulation section 152. In some embodiments, the threshold temperature difference value is selected to indicate when the insulation section 152 is no longer providing a desired level of thermal insulation. In the example illustrated by the chart in FIG. 4, the temperature difference between the interface temperature and the process temperature transitions from below the threshold temperature difference to above the threshold temperature difference at around the 14-hour mark, thereby indicating that the insulation section 152 may have become damaged around that time and requires repair or replacement. Thus, the controller 114 detects this damage or degraded condition of the insulation section 152 based on the difference between the interface temperature and the process temperature, and generates condition information 140 (e.g., a notification) in response to this detection of the condition.

As mentioned above, this monitoring of the interface temperature relative to the process temperature may include a compensation for ambient temperature conditions, on which the anticipated interface temperature has some dependency. Specifically, the threshold temperature difference may be adjusted based on a difference between the ambient temperature indicated by the ambient temperature sensor 126 and the process temperature indicated by the process temperature sensor 120, which are shown in FIG. 1. For example, when the difference between the ambient temperature and the process temperature is low, the threshold temperature difference value may be reduced due to the anticipated lower heat transfer between the process vessel 104 and the surrounding environment, and when the difference between the ambient temperature and the process temperature is high, the threshold temperature difference value may be increased due to the anticipated higher heat transfer between the process vessel 104 and the surrounding environment. Thus, the threshold temperature difference value may be dynamically adjusted by the controller 114 using the ambient temperature sensed or measured by the sensor 126.

In some embodiments, the one or more temperature sensors 112 are used by the controller 114 to measure the direct heat flow through the insulation section 152, and/or the thermal resistance (R-value) of the insulation section 152. For example, the controller 114 may use the difference between the interface temperature output 118A-1 by the one or more interface temperature sensors 112A-1, and the embedded temperature output 118A-2 from the one or more embedded temperature sensors 112A-2 and/or the exterior temperature output 118A-3 by the one or more exterior temperature sensors 112A-3 to calculate a heat flow through the insulated section 152, and/or a thermal resistance for the insulation section 152 using conventional techniques. The controller 114 may compensate these measurements of the heat transfer or thermal resistance based on the ambient temperature output 128 from the ambient temperature sensor 126 (FIG. 1). The controller 114 generates condition information 140, which may indicate the measured heat flow through the insulation section 152 and/or the thermal resistance of the insulation section 152.

In some embodiments, the controller 114 respectively compares the calculated heat flow and/or thermal resistance to a corresponding threshold heat flow or thermal resistance values, which may be stored in the memory 138 as one of the threshold values 164, to establish whether the insulation section 152 is providing a desired level of insulation. The condition information 140 generated by the controller 114 may indicate whether the heat flow through the insulation section 152 and/or the thermal resistance of the insulation section 152 meets a desired standard based on the threshold values.

Some embodiments of the monitoring device 150 include one or more moisture sensors 112B which, as mentioned above, may include a moisture detection cable, as illustrated in FIGS. 2 and 3. The moisture detection sensor 112B may be embedded within the insulation 106 and generate the moisture level output 118B relating to a detected moisture level. This allows the controller 114 to directly monitor for a moisture intrusion to the insulated section 152, which can lead to both degradation of the insulation section 152 and a CUI condition. In some embodiments, the controller 114 compares the detected moisture level to a threshold moisture level value, which may be stored as one of the threshold values 164 (FIG. 1). The controller 114 may generate condition information 140 based on the moisture level output 118B, and/or the comparison between the detected moisture level and the threshold moisture level value, which may include the detected moisture level and other related information. Additionally, when the detected moisture level exceeds the moisture level threshold value, the condition information 140 may include a notice of potential damage or degradation to the insulation section 152, and/or a notice indicating that conditions exist that may lead to a CUI condition, for example.

When the monitoring device 150 includes one or more of the chemical composition sensors 112C, the controller 114 may use the chemical compositions indicated by the corresponding outputs 118C to detect a CUI condition, or conditions that may lead to a CUI condition. The condition information 140 generated by the controller may include information regarding the detected chemical compositions, such as an identification of the detected compositions (e.g., iron oxides), a concentration of the detected compositions, and other information. In some embodiments, the controller 114 is configured to compare a concentration of a detected composition to a threshold concentration value, which may be stored as one of the threshold values 164 (FIG. 1). When the detected concentration level exceeds the threshold concentration value, the condition information 140 may include a notice of potential damage or degradation to the process vessel 104, a notice of potential damage or degradation to the insulation section 152, and/or a notice indicating that a CUI condition exists or may exist, for example.

As discussed above, some embodiments of the monitoring device 150 include one or more humidity sensors 112D. The one or more humidity sensors 112D generate the humidity level output 118D relating to a detected humidity level, which can be used by the controller 114 to directly monitor for conditions that can lead to a CUI condition. In some embodiments, the controller 114 compares the detected humidity level to a threshold humidity level value, which may be stored as one of the threshold values 164 (FIG. 1). The controller 114 may generate condition information 140 based on the humidity level output 118D, and/or the comparison between the detected humidity level and the threshold humidity level value, which may include the detected humidity. Additionally, when the detected humidity level exceeds the humidity level threshold value, the condition information 140 may include a notice of potential damage or degradation to the insulation section 152, and/or a notice indicating that conditions exist that may lead to a CUI condition, for example.

As mentioned above, the condition sensors 112 may utilize a plurality of the sensors 112 to sense a particular condition, such as temperature. Thus, for example, the temperature sensors 112A may include a plurality of temperature sensors 112A that are each used to perform discrete temperature measurements at various locations. For example, the interface temperature sensors 112A-1, the embedded temperature sensors 112A-2, and/or the exterior temperature sensors 112A-3 may each include a plurality of temperature sensors that are displaced from each other along the longitudinal axis 162 of the process vessel 104 or the insulation section 152, as shown in FIG. 3.

The temperature sensed by each of the individual temperature sensors 112A may be processed by the controller to determine an average temperature measurement. Thus, the temperatures sensed by the interface temperature sensors 112A-1 may be processed to determine an average interface temperature, the temperatures sensed by the embedded temperature sensors 112A-2 may be processed to determine an average embedded temperature, and the temperatures sensed by the exterior temperature sensors 112A-3 may be processed to determine an average exterior temperature. The controller 114 may use one or more of these average temperatures to detect the one or more conditions relating to the insulation section 152. The controller may similarly determine average measurements for other environmental conditions (e.g., humidity, moisture level, chemical composition, etc.) by averaging the measurements from multiple condition sensors 112.

Figure 5:
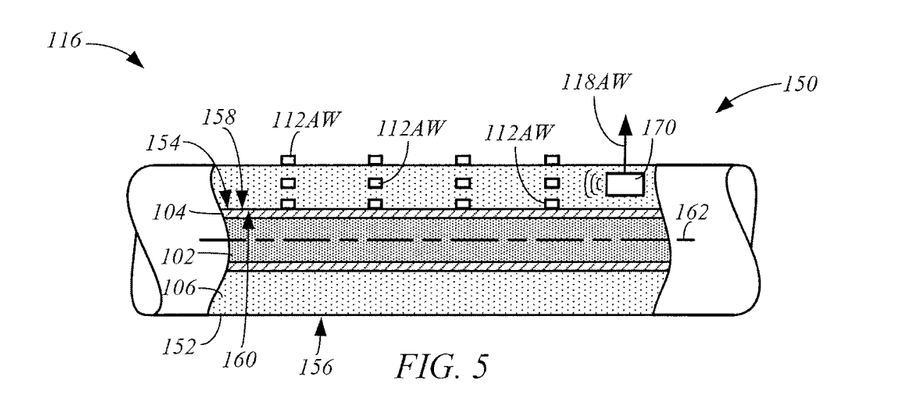
FIG. 5 is a simplified side cross-sectional view of an exemplary insulation monitoring device, in accordance with embodiments of the present disclosure.

The condition sensors 112 may take on any suitable form and may include wired connections to the transmitter 130 to convey the generated condition outputs. One exemplary alternative to this arrangement includes the use of passive surface acoustic wave sensors 112AW in combination with a radio frequency exciter and reader 170, as generally shown in FIG. 5, which is a simplified side cross-sectional view of an exemplary insulation monitoring device 150, in accordance with embodiments of the present disclosure. The surface acoustic wave sensors 112AW each receive energy from the radio frequency exciter and reader 170, which may be powered by the transmitter 130, and responsively generate a radio frequency signal that has a phase angle change or another detectable radio frequency characteristic change, such as frequency or amplitude, that is a function of the measured parameter. The exciter and reader 170 receives the signals from the acoustic wave sensors 112AW and delivers the condition outputs 118AW to the transmitter 130 (FIG. 1). Accordingly, the one or more temperature sensors 112A, moisture level sensors 112B, chemical composition sensors 112C and humidity sensors 112D, may be replaced with suitable surface acoustic wave sensors 112AW to thereby eliminate the need for wired connections to each of the sensors. Alternatively, the embedded measurement devices could take the form of passive RFID sensors that are energized and read by an RFID reader that may be powered by the transmitter 130.

Figure 6:
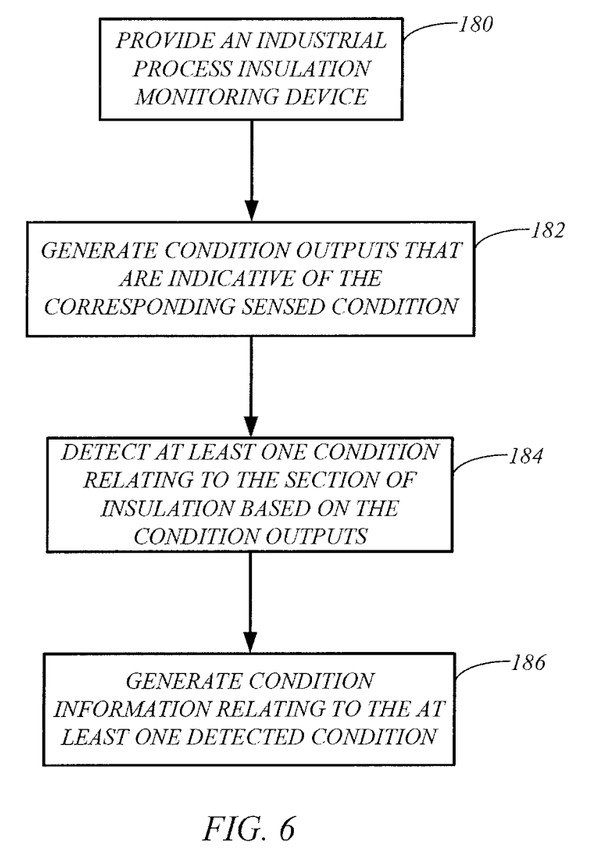
FIG. 6 is a flowchart illustrating an exemplary method of monitoring an insulated process vessel using an insulation monitoring device, in accordance with embodiments of the present disclosure.

Additional embodiments of the present disclosure are directed to a method of monitoring an insulated process vessel 104 using the insulation monitoring device 150. FIG. 6 is a flowchart illustrating an example of the method in accordance with embodiments of the present disclosure. At 180 of the method, an industrial process insulation monitoring device 150, which is formed in accordance with one or more embodiments described above, is provided. In some embodiments, the device 150 includes an insulation section 152 that is attached to the process vessel 104, and a plurality of condition sensors 112 that are attached to the insulation section 152. The condition sensors 112 are each configured to sense at least one environmental condition at or within the insulation section 152, such as temperature, humidity, moisture level and/or chemical composition, for example. The condition sensors 112 are configured to generate condition outputs 118 that are indicative of the corresponding sensed condition, such as a temperature output 118A, the moisture level output 118B, a chemical composition output 118C, and/or a humidity output 118D, as shown in FIG. 1.

At 182 of the method, condition outputs 118 are generated using the plurality of condition sensors 112 that are indicative of the corresponding sensed condition. At least one condition relating to the insulation section 152 is then detected, at step 184 based on the condition outputs 118, using the controller 114. For example, the controller 114 may detect a thermal resistance of the insulation section 152, damage (i.e., degradation) to the insulation section 152, corrosion of the process vessel 104 or conditions conducive to corrosion of the process vessel 104, and/or moisture intrusion of the insulation section 152, based on the condition outputs from the condition sensors 112, as discussed above.

At 186 of the method, condition information 140 is generated relating to the at least one detected section condition using the controller 114. As discussed above, the condition information 140 may identify the detected condition, include the sensed parameters relating to the detected condition, notifications regarding the detected condition, and/or other information relating to the detected condition. In some embodiments of the method, the condition information 140 is communicated to a user, such as through a display 142 of a control unit 132 (FIG. 1). The condition information 140 may also include notifications, such as an alarm, that notify the user of the detected condition.

Although the embodiments of the present disclosure have been described with reference to preferred embodiments, workers skilled in the art will recognize that changes may be made in form and detail without departing from the spirit and scope of the present disclosure.

What is claimed is:

1. An industrial process vessel insulation monitoring system for monitoring an insulated section of a process vessel containing a process material, the system comprising:
   one or more condition sensors configured to sense at least one environmental condition at or within the insulated section consisting of temperature, humidity, moisture level and chemical composition, wherein each of the one or more condition sensors is configured to generate a condition output that is indicative of the corresponding sensed condition; and
   a controller configured to detect at least one section condition relating to the insulated section including a thermal resistance of an insulation of the insulated section, based on the condition output, and generate condition information relating to the at least one detected section condition.

2. The system of claim 1, wherein the system includes a transmitter configured to receive the condition outputs and transmit section information, which is based on the condition outputs, to an external control unit.

3. The system of claim 1, wherein the one or more condition sensors comprise a radio frequency exciter and at least one surface acoustic wave sensor.

4. The system of claim 1, wherein:
the one or more condition sensors includes a moisture sensor configured to sense the moisture level and generate a moisture output indicative of the moisture level;
the controller is configured to detect the at least one section condition based on the moisture output; and
the at least one section condition includes a moisture intrusion to the insulation.

5. The system of claim 4, wherein the moisture sensor includes a moisture detection cable attached to the insulation.

6. The system of claim 1, wherein the one or more condition sensors includes one or more temperature sensors at a location selected from the group consisting of an interface between an exterior of the process vessel and the insulation, within the insulation and attached to an exterior surface of the insulation, each of the one or more temperature sensors configured to generate a temperature output that is indicative of the corresponding sensed temperature.

7. The system of claim 6, wherein:
the one or more temperature sensors includes at least two temperature sensors that are displaced from each other along an axis extending from an interface between the process vessel and the insulation to an external surface of the insulation; and
the at least one section condition includes the thermal resistance of the insulation.

8. The system of claim 6, wherein the one or more temperature sensors are each selected from the group consisting of a resistance temperature detector, a negative temperature coefficient thermistor, a thermocouple, and a semiconductor-based temperature sensor.

9. The system of claim 6, wherein:
the system comprises an ambient temperature sensor configured to generate an ambient temperature output indicative of an ambient temperature that is external to the insulation; and
the controller is configured to detect the at least one section condition based on the ambient temperature output.

10. The system of claim 6, wherein the one or more temperature sensors comprises a plurality of temperature sensors that are displaced from each other along a longitudinal axis of the process vessel.

11. The system of claim 10, wherein the controller detects the at least one section condition based on an average of the temperatures indicated by the temperature outputs of the plurality of temperature sensors.

12. The system of claim 6, wherein:
the one or more temperature sensors includes at least one interface temperature sensor at an interface between the process vessel and the insulation, the at least one interface temperature sensor configured to generate an interface temperature output that is indicative of a temperature of the interface; and
the controller is configured to detect the at least one section condition based on the interface temperature output.

13. The system of claim 12, wherein:
the at least one interface temperature sensor includes a plurality of interface temperature sensors that are displaced from each other along a longitudinal axis of the process vessel;
the one or more temperature sensors include a plurality of exterior temperature sensors that are attached to an exterior surface of the insulation, displaced from each other along the longitudinal axis, and configured to generate an exterior temperature output that is indicative of the temperature of the exterior surface of the insulation; and
the system includes a moisture sensor attached to the insulation and configured to sense a moisture level and generate a moisture output indicative of the moisture level;
the controller is configured to detect the at least one section condition based on the interface temperature output, the exterior temperature output and the moisture output; and
the at least one section condition comprises a moisture intrusion condition.

14. The system of claim 12, wherein:
the system includes a process temperature sensor configured to generate a process temperature output that is indicative of a temperature of a process material contained in the process vessel; and
the controller is configured to detect the at least one section condition based on the process temperature output.

15. The system of claim 14, wherein the controller is configured to detect the at least one section condition based on a comparison of a threshold value to a difference between the temperatures of the process material and the interface.

16. An industrial process vessel insulation monitoring device comprising:
a section of insulation;
a plurality of condition sensors attached to the insulation and configured to sense at least one environmental condition at or within the section of insulation consisting of temperature, humidity, moisture level and chemical composition, wherein each of the plurality of condition sensors is configured to generate condition outputs that are indicative of the corresponding sensed condition; and
wherein the plurality of condition sensors includes one or more temperature sensors attached to an interior surface of the section of insulation and an exterior surface of the section of insulation, each of the one or more temperature sensors configured to generate a temperature output that is indicative of the corresponding sensed temperature.

17. The device of claim 16, wherein the one or more temperature sensors comprises a plurality of temperature sensors attached to the interior surface and a plurality of temperature sensors attached to the exterior surface.

18. The device of claim 17, wherein the plurality of condition sensors includes a moisture sensor configured to sense a moisture level and generate a moisture output indicative of the sensed moisture level.

19. A method of monitoring an insulated process vessel comprising:
providing an industrial process insulation monitoring device comprising:

a section of insulation attached to the process vessel; and a plurality of condition sensors attached to the insulation and configured to sense at least one environmental condition at or within the section of insulation consisting of a temperature, a humidity, a moisture level and a chemical composition, wherein each of the plurality of condition sensors is configured to generate condition outputs that are indicative of the corresponding sensed condition;

generating condition outputs using the plurality of condition sensors, each condition output indicative of the corresponding sensed condition;

detecting at least one section condition relating to the section of insulation including a thermal resistance of the section of insulation, based on the condition outputs, using a controller; and generating condition information relating to the at least one detected section condition using the controller.

* * * * *